Nov. 30, 1954    J. H. MERCIER ET AL    2,695,778
SHOCK ABSORBER
Original Filed April 5, 1946
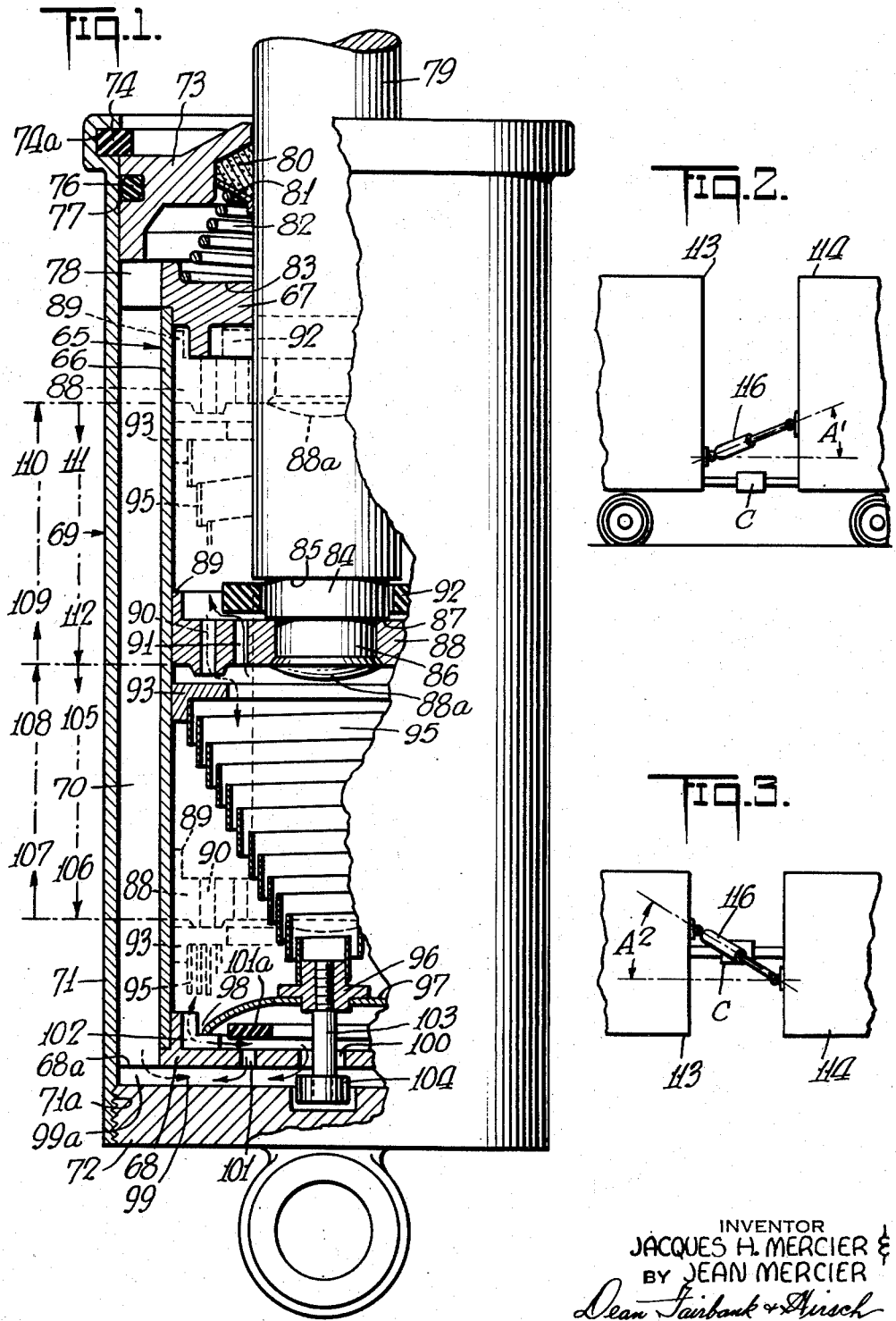
INVENTOR
JACQUES H. MERCIER &
BY JEAN MERCIER
Dean Fairbank & Hirsch
ATTORNEYS

United States Patent Office 2,695,778
Patented Nov. 30, 1954

1

2,695,778

SHOCK ABSORBER

Jacques H. Mercier and Jean Mercier, New York, N. Y.

Original application April 5, 1946, Serial No. 659,924, now Patent No. 2,565,617, dated August 28, 1951. Divided and this application August 17, 1951, Serial No. 247,178

4 Claims. (Cl. 267—8)

This invention relates to astatic shock absorbers and more specifically to the hydraulic or cylinder and piston type.

It is among the objects of the invention to provide a simple, compact shock absorber of relatively low cost which is not likely to become deranged and which may readily be manufactured, and which will dependably provide substantially free movement of the shock initiated stroke of its piston from the intermediate or neutral position to the extreme outer positions of the piston and which will snub the return movement of the piston to the neutral position.

According to the invention, a piston slidably mounted in a cylinder has a pair of fluid passages controlled by valves on each side of the piston. A fluid outlet passage from the cylinder to a fluid reservoir is provided at one end of the cylinder controlled by a constant reaction spring loaded check valve which normally urges the fluid outlet valve to closed position. A variable reaction spring is positioned between one of the piston valves and the fluid outlet valve to react against both of such valves so that as the piston moves toward the end of the cylinder having the fluid outlet, the associated piston valve and the fluid outlet valve will have a greater closing and opening force respectively exerted thereagainst, and as the piston moves away from the fluid outlet, the force exerted against the associated piston valve and fluid outlet valve to close and open the latter respectively will decrease.

Additional features therefore lie in the structural relationship of parts. One specific feature lies in the concentric arrangement of the inlet and outlet check valves. Another specific feature lies in the structural relationship of the variable pressure closing spring for the piston valve and a Belleville washer substantially constant pressure spring for the outlet check valve of the working cylinder.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to us, but such embodiment is to be regarded as typical only of many possible embodiments, and the invention is not to be limited thereto.

This application is division of application Serial No. 659,924, filed April 5, 1946, now Patent No. 2,565,617 dated August 28, 1951.

The novel features considered characteristic of our invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a longitudinal sectional view of the shock absorber showing the partition in its median position, and Figs. 2 and 3 illustrate diagrammatically a specific manner of the application of the shock absorber, namely as between two coupled railroad cars.

In the Fig. 1 embodiment of the shock absorber a working cylinder 65 comprises a cylindrical body portion 66, a top closure piece 67, and a bottom closure piece 68. The working cylinder is surrounded by an outer housing cylinder or container 69 forming with the working cylinder an annular reservoir 70, and comprising a cylindrical body portion 71, a bottom closure member 72 shown to be screwed into the cylindrical body portion 71 as at 71$^a$ and a top closure member 73 secured in the cylindrical body portion by a snap ring 74 sprung into an internal circular groove 74$^a$ formed at the upper end of the cylindrical body portion 71 and shown to be part thereof. The top closure member 73 has a sealing ring or so-called O-ring 76 extending in an annular external groove 77 for sealing the top closure member 73 against the surrounding cylindrical housing portion 71.

The working cylinder 65 is confined within the housing or container 69 by being immovably confined between the top and the bottom closure members 73 and 72 thereof. That is to say the top closure piece 67 of the working cylinder has a marginal overhanging or flange portion 78 upon which engages the top closure member 73 of the housing, while the bottom closure piece 68 of the working cylinder has a marginal flange portion 68$^a$ engaged by the bottom closure member 72 of the housing. A piston rod 79 extends through the top end closure portions of the working cylinder as well as the container 69 and is sealed by a gland represented by a sealing ring 80 held in place by a confining ring 81 held under pressure by a coil spring 82 which in turn is braced against the top closure piece 67 of the working cylinder, lodging in a shallow recess 83 thereof. The piston rod is formed at its lower end with a reduced portion 84 forming a shoulder 85, and also formed with a further reduced portion 86 forming a shoulder 87 upon which is seated a piston member 88 fixed in place by the riveted extreme end portion 88$^a$ of the piston rod. The piston member 88 has an upwardly extending skirt portion 89, and is provided with an outer set of flow transfer passages 90 for fluid transfer through the piston downwardly, and further provided with an inner set of flow transfer passages 91 for fluid transfer through the piston in the opposite direction, namely upwardly. Between the piston member 88 and the shoulder 85 there operates a movable annular unbiased check valve member 92 surrounding the reduced portion 84 and adapted to close the flow transfer passages 91.

The flow passages 90 are adapted to be closed by an annular thrust plate 93 or annular valve member which may be of hard fiber or similar composition. The valve member 93 is under the influence of the wide end of a flat spirally coiled spring 95, the narrow end of the spring being braced against a thrust member 96 engaging a Belleville washer spring 97 which is marginally seated in a shallow recess 98 of the bottom closure piece 68 which is also provided with another shallow recess 99 at the underside as well as with a central outlet flow passage 100 for downward flow therethrough, flow passages 101 for upward flow therethrough past an annular unbiased check valve member 101$^a$, and with recesses 102 to constitute 2-way flow passages. Radially from the recess 99 extend one-way flow passages 99$^a$ through which fluid may be drawn from the reservoir 70.

Rigidly connected with and downwardly from the thrust member 96 extends a valve stem 103 at the lower end of which is provided a valve member 104.

The tension of the Belleville spring washer 97 is opposed to that of the spirally wound coil spring 95, the Belleville spring being a constant reaction spring and substantially weaker than the spiral wound spring 95 which has a variable reaction characteristic.

When the piston is in its median or zero position (as shown in full lines) the spiral coil spring 95 is partially compressed exerting a corresponding pressure against Belleville washer spring 97 and thereby partially neutralizing the valve closing tendency thereof.

When a shock is received as by the car wheel hitting a hump on the road, the piston rod 79 is thereby retracted, moving the piston member 88 down from its median or zero position as indicated by arrow 105.

The spring 95 is further compressed overcoming the counterpressure of Belleville washer spring 97 thereby fully opening the valve 104. Hence the piston moves downwardly on its shock-initiated stroke against relatively little hydraulic pressure resistance since excess pressure fluid can escape through outlet passage 100 while fluid from the underside of the piston is being displaced past the check valve 92 to the space above the piston.

The lowermost or bottom dead center position of the piston is indicated in the partial dot-and-dash line showing thereof as well as by the arrow 106, and by the condition of the spring 95 indicated to be fully compressed.

Upon reversal of the piston movement from the bottom dead center position in the direction of arrow 107, hydraulic resistance pressure is encountered since the check valve member 92 closes. That is to say the fluid from above the piston must be displaced through the transfer passages 90 against the valve closing pressure of the spring 95, until the piston reaches again its neutral or median position corresponding to arrow 108.

When a shock is received as by the car wheel hitting a depression in the road, the piston rod 79 is thereby extended moving the piston member 88 upwardly from its median position as indicated by arrow 109.

During this upward shock-initiated stroke the spring 95 expands further relieving the valve-closing pressure upon transfer flow passages 90, hence little hydraulic pressure resistance is encountered by the piston on this stroke until the piston reaches the top dead center position indicated by the partial dot-and-dash line showing thereof as well as by arrow 110.

When the piston reaches its upper dead center position, the transfer passages 90 become partially blanked off by the top closure piece 67 of the working cylinder.

Upon reversal of the piston from its top dead center position, as indicated by arrow 111, hydraulic pressure resistance is encountered by the piston on its return stroke for the reason that the valve member 93 closes while the check valve member 92 opens, but the outlet passage 100 is kept closed by the closing tendency of the Belleville spring washer 97, since the spring 95 is not yet compressed sufficiently to exert sufficient counter-pressure upon the Belleville spring washer to open the outlet valve member 104. However as the compression of spring 95 increases, it will finally overcome the counter-pressure from the Belleville spring washer so as to open valve member 104 causing the hydraulic pressure resistance to drop as the piston again approaches its neutral or median position indicated by arrow 112.

With respect to the Fig. 1 embodiment of a shock absorber, we have found it to be advantageous to embody the following dimensional relationship between the inner diameter D of the working cylinder and the diameter "d" of the piston rod:

$$D \text{ approx. equal to } d\sqrt{2}$$

For example with $$D = 1\tfrac{1}{8}''$$
$$d = .75''$$

Figs. 2 and 3 show diagrammatically an application of the shock absorber for dampening the shocks or impacts between coupled freight cars, Fig. 2 being a side view, and Fig. 3 being a plan view of the mounting of the shock absorber as proposed by this invention.

Two freight cars 113 and 114 are interconnected by a coupling "C" as well as by a shock absorber 116 mounted in a novel manner in that its longitudinal or thrust axis extends at an angle "$A_1$" relative to the horizontal plane, as well as at an angle "$A_2$" relative to the longitudinal axis of the cars, that is at an angle relative to the path of their forward movement.

As a result of this mounting shocks between the cars are effectively absorbed not only when they occur in longitudinal direction, that is in the line of progress of the cars, but also when they occur transversely between the cars.

As many changes could be made in the above construction, and many apparent widely different embodiments of this invention could be made without departing from the scope of the claims, it is intended that all matter contained in the above description or shown in the accompanying drawings shall be interpreted as illustrative and not in a limiting sense.

We claim:

1. Shock absorber apparatus comprising a reservoir for fluid, a working cylinder associated with said reservoir and comprising a body portion having two end sections, one of said sections having an inlet passageway and a discharge passageway for fluid flow between said reservoir and said cylinder, check valves to control said inlet passageway and said discharge passageway respectively, a movable partition in said cylinder reciprocable between its end sections, a passageway through said partition, a check valve to control said partition passageway for flow of fluid therethrough into the portion of the cylinder between the partition and discharge passageway, a resilient variable reaction member between said discharge passageway check valve and said partition passageway check valve and controlling said two check valves, a second passageway in said partition, a check valve to control said second passageway for flow of fluid in direction opposed to that through the other passageway in said partition, whereby when said partition is moved toward the discharge passageway in said cylinder said resilient variable reaction member exerts an increasing opening pressure against the check valve controlling said discharge passageway and an increasing closing pressure against the check valve controlling the first passageway through said partition, a second resilient means to control said discharge passageway check valve and normally urging the latter to closed position, said second resilient means being positioned between said first resilient member and said discharge passageway check valve and opposing the action of said first resilient reaction member, and means operatively connected to said movable partition to reciprocate the latter upon reciprocation of said means, whereby the pressure exerted by the variable reaction member against the associated valve means varies accordingly.

2. The combination recited in claim 1 in which the discharge passageway is centrally located in the associated end section and the valve means therefore comprises a valve member extending therethrough and in cooperative association with said variable reaction means.

3. The combination recited in claim 1 in which the discharge passageway is centrally located in the associated end section, the valve means comprises a stem extending through said passageway and in cooperative association with said variable reaction means and in which the check valve controlling the inlet passageway in said end section comprises an annular valve member encompassing said valve stem.

4. The combination recited in claim 1 in which the discharge passageway is centrally located in the associated end section, the valve means comprises a stem extending through said passageway and in cooperative association with said variable reaction means and in which the second resilient means comprises a Belleville washer spring positioned within said working cylinder adjacent the end section having the discharge passageway.

References Cited in the file of this patent

UNITED STATES PATENTS

| Number | Name | Date |
|--------|------|------|
| 2,355,491 | Whisler | Aug. 8, 1944 |
| 2,379,750 | Rossman | July 3, 1945 |
| 2,395,027 | Whisler | Feb. 19, 1946 |
| 2,565,617 | Mercier | Aug. 28, 1951 |